United States Patent
Pham

(10) Patent No.: US 10,462,143 B1
(45) Date of Patent: Oct. 29, 2019

(54) METHOD AND SYSTEM FOR ELECTRONIC MAIL ATTACHMENT MANAGEMENT

(71) Applicant: Capital One Services, LLC, McLean, VA (US)

(72) Inventor: Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/198,191

(22) Filed: Nov. 21, 2018

(51) Int. Cl.
  *H04L 29/06* (2006.01)
  *H04L 12/58* (2006.01)
  *G06F 16/176* (2019.01)
  *G06N 3/08* (2006.01)

(52) U.S. Cl.
  CPC ........... *H04L 63/10* (2013.01); *G06F 16/176* (2019.01); *G06N 3/08* (2013.01); *H04L 51/08* (2013.01); *H04L 51/10* (2013.01); *H04L 51/12* (2013.01)

(58) Field of Classification Search
  None
  See application file for complete search history.

(56) References Cited

U.S. PATENT DOCUMENTS

| | | | | |
|---|---|---|---|---|
| 2005/0097179 A1* | 5/2005 | Orme | ........... | H04L 51/12 709/207 |
| 2008/0215722 A1* | 9/2008 | Hogaboom | ........... | H04L 29/06 709/224 |
| 2009/0132658 A1* | 5/2009 | Glickstein | ........... | H04L 51/12 709/206 |
| 2012/0297463 A1* | 11/2012 | Orbach | ........... | G06Q 10/107 726/4 |
| 2013/0117809 A1* | 5/2013 | McDougal | ........... | H04L 63/1408 726/1 |
| 2015/0288706 A1* | 10/2015 | Marshall | ........... | H04L 63/123 726/23 |
| 2018/0234368 A1* | 8/2018 | Everton | ........... | H04L 51/10 |
| 2019/0147191 A1* | 5/2019 | Lowrance | ........... | G06F 21/6227 |

* cited by examiner

*Primary Examiner* — Michael R Vaughan
(74) *Attorney, Agent, or Firm* — DLA Piper LLP (US)

(57) ABSTRACT

A method of preventing unauthorized access to electronic mail attachment is disclosed herein. A message management system receives one or more files designated as sensitive files. The message management system generates one or more hash values by applying a hash function to each of the one or more images corresponding to the file. The message management system stores the one or more hash values in a database. The message management system receives an outgoing electronic message that includes an attached file. The message management system generates one or more attachment hash values for the attached file by applying the hash function to the attached file. The message management system compares the one or more attachment hash values to the database. The message management system determines that at least one attachment hash value matches at least one hash value. The message management system blocks the outgoing electronic message.

17 Claims, 8 Drawing Sheets

METHOD AND SYSTEM FOR ELECTRONIC MAIL ATTACHMENT MANAGEMENT

FIELD OF THE DISCLOSURE

The present disclosure generally relates to a method and a system for preventing unauthorized access to electronic mail attachments.

BACKGROUND

Typically, members of a company or organization may access a file system that stores one or more files associated with the company or organization. Within the file system may be one or more files that are deemed privileged, or sensitive. Such privileged or sensitive files may only be shared among members of the company or organization, and may not be transmitted outside of the company. Conventional message management systems are limited in their abilities to intercept and determine whether a file attached to an outgoing message is indeed a privileged, or sensitive file.

SUMMARY

A method of preventing unauthorized access to electronic mail attachment is disclosed herein. A message management system receives, from an administrator computing device, one or more files designated as sensitive files. For each file of the one or more files the message management system converts the file to one or more images. The message management system generates one or more hash values by applying a hash function to each of the one or more images corresponding to the file. The message management system stores the one or more hash values in a database. The message management system receives, from a client device, an outgoing electronic message that includes an attached file. The message management system generates one or more attachment hash values for the attached file by applying the hash function to the attached file. The message management system compares the one or more attachment hash values to the database storing the one or more hash values associated with the one or more files designated as sensitive files. The message management system determines that at least one attachment hash value of the one or more attachment hash values matches at least one hash value of the one or more hash values stored in the database. The message management system blocks the outgoing electronic message.

In some embodiments, generating the one or more attachment hash values for the attached file by applying the hash function to the attached file includes the message management system further converting the attached file to one or more attachment images and applying the hash function to the one or more attachment images.

In some embodiments, a file type of the one or more images and an attachment file type of the one or more attachment images are the same.

In some embodiments, generating the one or more attachment hash values for the attached file by applying the hash function to the attached file includes the computing system determining that the attached file is an attachment image, generating multiple versions of the attachment image using a neural network model, and applying the hash function to each version of the multiple versions of the attachment image.

In some embodiments, the message management system further receives, from a second client device, a second outgoing electronic message comprising a second attached file. The message management system generates one or more second attachment hash values for the second attached file by applying the hash function to the second attached file. The message management system compares the one or more second attachment hash values to the database storing the one or more hash values associated with the one or more files designated as sensitive files. The message management system determines that none of the second attachment hash values matches at least one hash value of the one or more hash values stored in the database. The message management system permits the second outgoing electronic message.

In some embodiments, permitting the second outgoing electronic message includes the message management system forwarding the second outgoing electronic message to a remote messaging service.

In some embodiments, the message management system receives, from a second client device, a second outgoing electronic message that includes a second attached file. The message management system compares a second file name string associated with the second attached file to one or more file name strings stored in the database. The message management system determines that the second file name string is within a threshold amount of characters as at least one file name string stored in the database. The message management system blocks the second outgoing electronic message.

In another embodiment, a method of preventing unauthorized access to electronic mail attachment is disclosed herein. The message management system receives, from an administrator computing device, one or more files designated as sensitive files. The message management system determines that the one or more files comprises at least a first set of first files that are of a database file type. The message management system uploads the first set of first files to a database. The message management system receives, from a client device, an outgoing electronic message that includes an attached file. The message management system determines that the attached file is of a database file type. The message management system uploads data in the attached file to a database table. The message management system joins the database table to the database storing the first set of first files. The message management system determines that the database table is a subset of the database. The message management system blocks the outgoing electronic message.

In some embodiments, the message management system receives, from a second client device, a second outgoing electronic message comprising a second attached file. The message management system determines that the second attached file is of a database file type. The message management system uploads data in the second attached file to the database table. The message management system joins the second database table to the database storing the first set of first files. The message management system determines that the second database table is not a subset of the database. The message management system permits the second outgoing electronic message.

In some embodiments, permitting the second outgoing electronic message includes the message management system forwarding the second outgoing electronic message to a remote messaging service.

In some embodiments, the message management system determines that the one or more files further includes a second set of second files that are not of a database file type. For each second file of the one or more second files, the message management system converts the second file to one or more images. The message management system generates one or more hash values by applying a hash function to each of the one or more images corresponding to the second file. The message management system stores the one or more hash values in a second database.

In some embodiments, the message management system receives, from the client device, a second outgoing electronic message that includes a second attached file. The message management system determines that the second attached file is not of a database file type. The message management system generates one or more attachment hash values for the second attached file by applying the hash function to the second attached file. The message management system compares the one or more attachment hash values to the second database storing the one or more hash values associated with the one or more second files. The message management system, determines that at least one attachment hash value of the one or more attachment hash values matches at least one hash value of the one or more hash values stored in the second database. The message management system blocks the second outgoing electronic message.

In some embodiments, generating the one or more attachment hash values for the second attached file by applying the hash function to the attached file includes the message management system converting the second attached file to one or more attachment images and applying the hash function to the one or more attachment images.

In some embodiments, generating the one or more attachment hash values for the second attached file by applying the hash function to the second attached file includes the computing system determining that the second attached file is an attachment image, generating multiple versions of the attachment image using a neural network model, and applying the hash function to each version of the multiple versions of the attachment image.

In some embodiments, the message management system receives, from a second client device, a third outgoing electronic message comprising a third attached file. The message management system generates one or more second attachment hash values for the third attached file by applying the hash function to the third attached file. The message management system compares the one or more second attachment hash values to the second database storing the one or more second hash values associated with the one or more second files designated as sensitive files. The message management system determines that none of the second attachment hash values matches at least one hash value of the one or more hash values stored in the second database. The message management system permits the third outgoing electronic message.

In another embodiment, a method of preventing unauthorized access to electronic mail attachment is disclosed herein. A message management system receives, from a client device, one or more files designated as sensitive files. For each file of the one or more files, the message management system converts the file to one or more images. The message management system generates one or more hash values by applying a hash function to each of the one or more images corresponding to the file. The message management system stores the one or more hash values in a database. The message management system receives, from a client device, an outgoing electronic message comprising an attached file. The message management system generates one or more attachment hash values for the attached file by applying the hash function to the attached file. The message management system compares the one or more attachment hash values to a database storing one or more hash values associated with one or more files pre-designated as sensitive files. The message management system determines that at least one attachment hash value of the one or more attachment hash values matches at least one hash value of the one or more hash values stored in the database. The message management system blocks the outgoing electronic message.

In some embodiments, generating the one or more attachment hash values for the attached file by applying the hash function to the attached file includes the message management system converting the attached file to one or more attachment images and applying the hash function to the one or more attachment images.

In some embodiments, a file type of the one or more images and an attachment file type of the one or more attachment images are the same.

In some embodiments, generating the one or more attachment hash values for the attached file by applying the hash function to the attached file includes the message management system determining that the attached file is an attachment image, generating multiple versions of the attachment image using a neural network model, and applying the hash function to each version of the multiple versions of the attachment image.

In some embodiments, the message management system further receives, from the client device, a second outgoing electronic message comprising a second attached file. The message management system determines that the second attached file is of a database file type. The message management system uploads data in the second attached file to a database table. The message management system joins the database table to a second database storing a set of database files pre-designated as sensitive files. The message management system determines that the database table is a subset of the second database. The message management system blocks the second outgoing electronic message.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In conventional systems, members of a company or organization typically have access to a file system that stores one or more files associated with the company or organization. Among the one or more files may be one or more sensitive files that the company may have deemed privileged. Such privileged, or sensitive, files may only be transmitted among members of the company and may not be transmitted to external individuals (i.e., non-company members). Typical message management systems are simply unable to intercept outgoing electronic mail messages having a file attached thereto and determine whether the file is deemed to be a sensitive file.

The present disclosure attempts to address to deficiencies of conventional message management systems by providing a re-configured message management system that is able to intercept outgoing electronic mail messages that have a file attachment and determine whether the file attachment is indeed a sensitive file. For example, the message management service may leverage a document conversion and hashing process that converts all sensitive files to a common document format and performs a hashing operation on the sensitive files. Accordingly, when an outgoing message is intercepted, the message management system may convert the file attachment to the common file format, hash the converted file attachment, and compare the hashed values to a database of hashed values to determine if the file attachment is indeed a sensitive file.

Further, those skilled in the art may readily understand that a fraudulent individual may attempt to bypass the security aspect of the message management system by taking a screenshot or converting the document to an image format prior to attaching the sensitive file to an outgoing electronic mail message. The present disclosure anticipates such scenario by providing a neural network module that creates multiple versions of the image, hashing each version image, and comparing each hash value to the database of hashed values to determine if the attachment is indeed a sensitive file.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
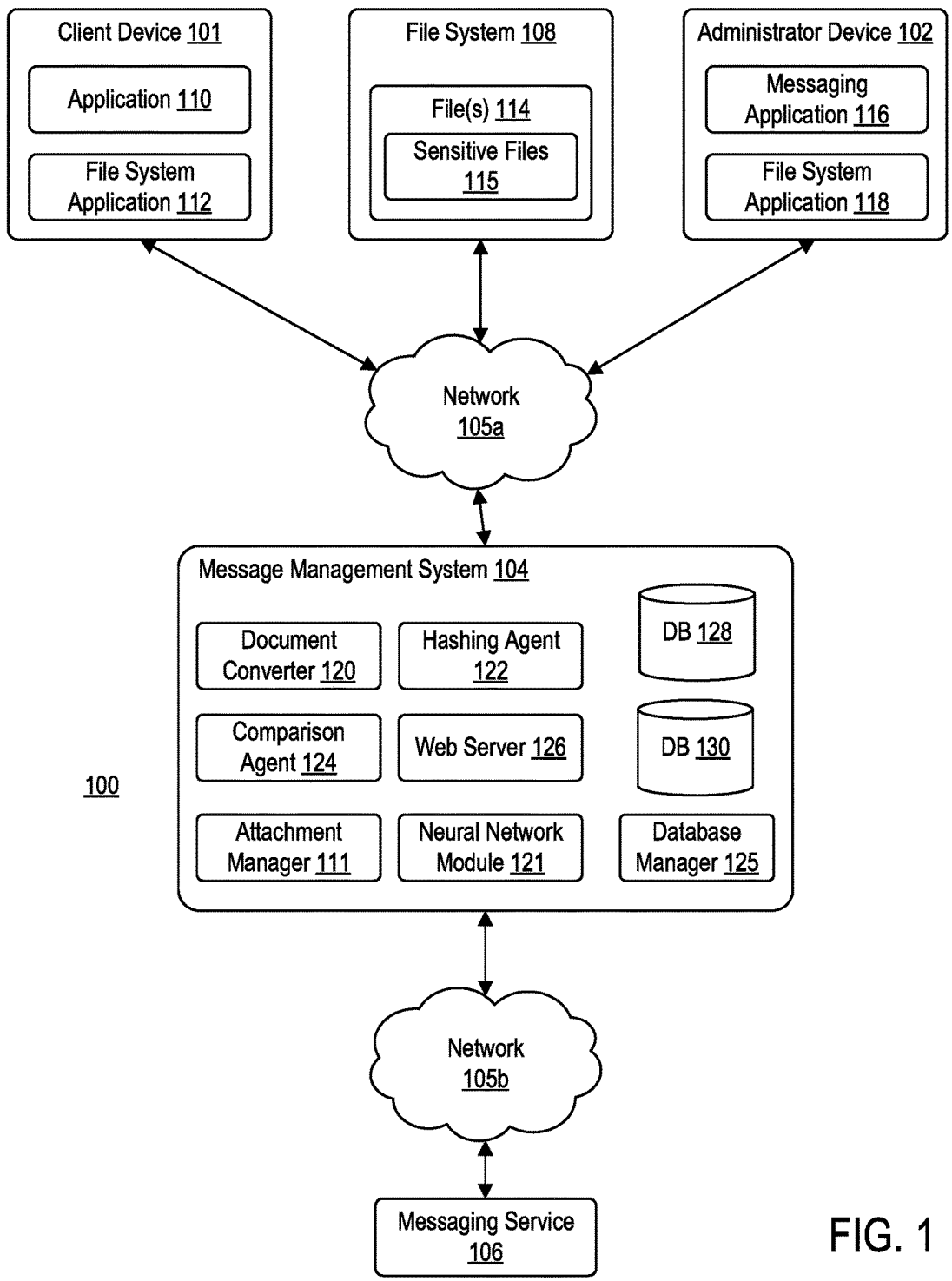
FIG. 1 is a block diagram illustrating a computing environment, according to one exemplary embodiment.

FIG. 1 is a block diagram illustrating a computing environment 100, according to one embodiment. Computing environment 100 may include at least a client device 101, file system 108, administrator device 102, message management system 114, and messing service 106. Client device 101, file system 108, administrator device 102, and message management service 114 may communicate via network 105a. Message management system 114 and messaging service 106 may communicate via network 105b.

Each of network 105a and network 105b may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Each of network 105a and network 105b may include any type of computer networking arrangement used to exchange data. For example, each of network 105a and network 105b may be the Internet, a private data network, virtual private network using a public network and/or other suitable connection(s) that enables components in computing environment 100 to send and receiving information between the components of system 100.

Client device 101 may be operated by a user (or employee). For example, client device 101 may be a mobile device, a tablet, a desktop computer, or any computing system having the capabilities described herein. Client device 101 may belong to or be provided to an employee of a facility (e.g., user 101).

Client device 101 may include application 110 and file system application 112. Application 110 may be representative of a web browser that allows access to a service (or website) or a stand-alone application. Client device 101 may access application 110 to access functionality of message management system 114. Client device 101 may communicate over network 105a to send and/or receive electronic messages, for example, from message management system 114 that were sent to or received from messaging service 106. For example, client device 101 may be configured to execute application 110 to manage an electronic message account hosted on messaging service 106 and managed by message management service 114. The content that is displayed to client device 101 may be transmitted client device 101, and subsequently processed by application 110 for display through a graphical user interface (GUI) of client device 101.

File system application 112 may be representative of a web browser that allows access to a service (or website) or a stand-alone application. Client device 101 may access file system application 112 to access functionality of file system 108. Client device 101 may communicate over network 105a to request one or more files 114, for example, from file system 108. For example, client device 101 may be configured to execute file system application 112 to retrieve one or more files 114 from file system 108, edit one or more files 114 stored on file system 108, add one or more files 114 to file system 108, and/or manage one or more files 114 on file system 108. The content that is displayed to client device 101 may be transmitted to client device 101, and subsequently processed by application 112 for display through a GUI of client device 101.

Administrator device 102 may be operated by an individual that has administrator rights to file system 108. For example, administrator device 102 may be a mobile device, a tablet, a desktop computer, or any computing system having the capabilities described herein. Client device 101 may belong to or be provided to an employee of an organization that may, for example, have administrator rights that includes the marking of one or more files (e.g., files 114) as sensitive files.

Administrator device 102 may include messaging application 116 and file system application 118. Messaging application 116 may be representative of a web browser that allows access to a service (or website) or a stand-alone application. Administrator device 102 may access application 116 to access functionality of message management system 114. Administrator device 102 may communicate over network 105a to send and/or receive electronic messages, for example, from message management system 114 that were sent to or received from messaging service 106 For example, administrator device 102 may be configured to execute messaging application 116 to manage an electronic message account hosted on messaging service 106 and managed by message management service 114. The content that is displayed to administrator device 102 may be transmitted administrator device 102, and subsequently processed by messaging application 116 for display through a GUI of client device 101.

File system application 118 may be representative of a web browser that allows access to a service (or website) or a stand-alone application. Administrator device 102 may access file system application 118 to access functionality of file system 108. Administrator device 102 may communicate over network 105a to request one or more files 114, for example, from file system 108. For example, client device 101 may be configured to execute file system application 112 to retrieve one or more files 114 from file system 108, edit one or more files 114 stored on file system 108, add one or more files 114 to file system 108, and/or manage one or more files 114 on file system 108. The content that is displayed to client device 101 may be transmitted to client device 101, and subsequently processed by application 112 for display through a GUI of client device 101. Administrator device 102 may differ from client devices 101 in that users of administrator device 102 may be configured to mark one or more files 114 as sensitive.

Marking one or more files 114 as sensitive may prevent users that do not have administrator privileges from attaching a file 114 marked as sensitive to an electronic message. In some embodiments, marking one or more files 114 as sensitive may also estop users that have administrator privileges from attaching a file 114 marked as sensitive to an electronic message. In some embodiments, marking one or more files 114 as sensitive may include injecting metadata into each sensitive file to signal to message management service 114 that such files 114 are sensitive. Further, in some embodiments, administrator device 102 may transmit each file 114 marked as sensitive to message management system 114 for further processing.

Message management system 114 may be configured to be logically positioned between client device 101, administrator device 102 and messaging service 106. Message management system 114 may be configured to manage outgoing electronic messages from client device 101 and/or administrator device 102 and incoming electronic messages from messaging service 106 to client device 101 and/or administrator device 102. For example, message management system 114 may manage the sending of electronic messages that includes one or more file attachments, such that those file attachments that are representative of a file 114 marked as sensitive are not transmitted. As illustrated, message management system 114 may communicate with one or more of client device 101, file system 108, and administrator device 102 via network 105a. Message management system 114 may communicate with messaging service 106 via network 105b.

Message management system 114 may include document converter 120, hashing agent 122, comparison agent 124, web server 126, attachment manager 111, neural network module 121, database manager 125, and one or more databases—database 128 and database 130. Each of document converter 120, hashing agent 122, comparison agent 124, attachment manager 111, neural network module 121, database manager 125, and web server 126 may be comprised of one or more software modules. The one or more software modules may be collections of code or instructions stored on a media (e.g., memory of message management system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Document converter 120 may be configured to convert one or more sensitive files 115 from a first file type to a second file type. In operation, document converter 120 may be configured to identify a first file type associated with a particular sensitive file 115. For example, document converter 120 may identify that the first file type of a particular sensitive file 115 is a non-database file type. A non-database file type may include, but is not limited to, a computer-aided design (CAD) file type (e.g., .ocd, .dwb, etc.), a desktop publishing file type (e.g., .ai, .psd, .pdf, etc.), a document file type (e.g., .doc, .docx, .html, .rtf, etc.), a presentation file type (e.g., .ppt, .odp, etc.), and the like. A database file type may include, but is not limited to, a database file (e.g., .db, .frm, .sqlite, etc.), a spreadsheet file type (e.g., .xls, .ots, .ods, etc), a tabulated data type (e.g., .tsv, .csv, etc.), and the like. The second file type may be associated with an image file type. For example, the second file type may be a raster graphic file type (e.g., .jpeg, .png, .bmp, etc.)

In some embodiments, document converter 120 may convert a sensitive file 115 in a first file type to one or more files in a second file type. For example, document converter 120 may create one or more images (e.g., .jpeg files) based on the sensitive file (e.g., in a .doc file). The one or more images may include one or more portions of sensitive file 115, as well as the entirety of sensitive file 115.

Hashing agent 122 may be configured to generate a hash value for each sensitive file converted to the second file type using a hash function. For example, as recited above, document converter 120 may convert a sensitive file 115 having a first file type (e.g., .doc, .ppt, .pdf, .xls, etc.) to one or more files in a second file type (e.g., .jpeg, .png, etc.). Each of the one or more files in the second file type may be hashed by hashing agent 122 using a hashing function, such that a hash value is generated for each of the one or more files. Exemplary hashing functions may include, but are not limited to, SHA-512, CRC-64, MD6, and the like. Hashing agent 122 may store each hash value in database 128. For example, hashing agent 122 may store each hash value in database 128 along with the sensitive file 115 to which one or more hash values correspond.

Attachment manager 111 may be configured to intercept one or more outgoing electronic messages from client device 101. Upon receiving an outgoing electronic message from client device 101, attachment manager 111 may determine whether the outgoing electronic message includes a file attachment thereto. Attachment manager 111 may parse the file attachment to determine a file type of the file attachment.

In some embodiments, attachment manager 111 may determine that the file attachment is of a raster graphic file type. Upon determining that the file attachment is of a raster graphic file type, attachment manager 111 may transfer control to neural network module 121 for further analysis.

In some embodiments, attachment manager 111 may determine that the file attachment is of a non-database file type. Upon determining that the file attachment is of a non-database file type, attachment manager 111 may transfer control to document converter 120 such that document converter 120 can convert the file attachment to one or more images.

In some embodiments, attachment manager 111 may determine that the file attachment is a database file type. Upon determining that the file attachment is of a database file type, attachment manager 111 may transfer control to document converter 120 such that document converter 120 can convert the file attachment to one or more images.

In some embodiments, attachment manager 111 may determine that the file attachment is a database file type. Upon determining that the file attachment is of a database file type, attachment manager 111 may transfer control to file manager 117 such that file manager 117 can extract information from the file attachment for further analysis.

Further, in some embodiments, attachment manager 111 may determine that the file attachment is of a compressed file type (e.g., .zip, .arc, .jar, .rar, etc.). Upon determining that the file attachment is of a compressed file type, attachment manager 111 may decompress the file attachment and extract one or more files of a non-compressed file type. Attachment manager 111 may analyze the decompressed files in accordance with the operations discussed above.

Document converter 120 may be configured to convert file attachments in outgoing electronic messages from a first file type to a second file type to determine whether a file attachment to an outgoing electronic message is a sensitive file 115. For example, document converter 120 may receive a file attachment from attachment manager 111 with instructions to convert the file attachment from a first format (e.g., database file type, non-database file type) to a second format (e.g., a raster graphic file type). In some embodiments, document converter 120 may convert an attachment file in a first file type to one or more files in a second file type. For example, document converter 120 may create one or more images (e.g., .jpeg files) based on the file attachment (e.g., in a .doc file). Generally, document converter 120 may create one or more images that are of a raster graphic file type that is similar to the raster graphic file type used to convert the one or more sensitive files 115. The one or more images may include one or more portions of the file attachment, as well as the entirety of file attachment.

Hashing agent 122 may be configured to generate a hash value for each file attachment converted to the second file type using a hash function. For example, as recited above, document converter 120 may convert a file attachment having a first file type (e.g., .doc, .ppt, .pdf, .xls, etc.) to one or more files in a second file type (e.g., .jpeg, .png, etc.). Each of the one or more files in the second file type may be hashed by hashing agent 122 using a hashing function, such that a hash value is generated for each of the one or more files. Exemplary hashing functions may include, but are not limited to, SHA-512, CRC-64, MD6, and the like. Generally, hashing agent 122 may apply the same hashing function that was used to generate hash values for the one or more sensitive files 115.

Comparison agent 124 may be configured to compare one or more hash values of the one or more converted file attachments to one or more hash values stored in database 108. A match between at least one of the one or more hash values of the one or more converted file attachments with at least one of the one or more hash values stored in database 108 may signal to comparison agent 124 that the file attachment is a sensitive file 115. Accordingly, comparison agent 124 may signal to attachment manager 111 to block the outgoing message that contains the file attachment corresponding to sensitive file 115.

As briefly recited above, in some embodiments, message management system 114 may determine that the file attachment is of a raster graphic file type. For example, in some situations, users of client device 101 may attempt to bypass sensitive file settings by taking a screenshot of sensitive file 115 or converting sensitive file 115 to an image format. To combat this, upon determining that the file attachment is of a raster graphic file type, attachment manager 111 may transfer control to neural network module 121 for further analysis. In some embodiments, attachment manager 111 may first transfer control to document converter 120. For example, document converter 120 may ensure that the raster graphic file type of the file attachment is the same as the raster graphic file type to which each sensitive file 115 was converted.

Neural network module 121 may be configured to create multiple versions of the file attachment. Neural network module 121 may generate the multiple versions of the file attachment using a neural network model. For example, neural network module 121 may implement a deep convolutional neural network. As input to the deep convolutional neural network, neural network module 121 may provide the original image or document; the output from the deep convolutional neural network may be the variance of the original image (e.g., snapshot of a portion of the image, part of a spreadsheet, deformed copy and paste into a new document, high resolution of the original image to low resolution of the attached image, etc.) In another example, neural network module 121 may use a one shot neural network model. The one shot neural network model may highlight one or more points of interest. For example, the attachment may be a snapshot of a file. The one shot neural network model may be configured to target a location of the image where the highly sensitive document is most likely to occur. The multiple versions of the file attachment may include a gray-scaled version of the file attachment, one or more partial versions of the file attachment, an up-scaled version of the file attachment, and the like.

Hashing agent 122 may be configured to generate a hash value for each version of the multiple versions of the file attachment using a hash function. Each of the multiple versions of the file attachment may be hashed by hashing agent 122 using a hashing function, such that a hash value is generated for each of the one or more files. Exemplary hashing functions may include, but are not limited to, SHA-512, CRC-64, MD6, and the like. Generally, hashing agent 122 may apply the same hashing function that was used to generate hash values for the one or more sensitive files 115.

Comparison agent 124 may be configured to compare the multiple hash values of the multiple versions of the file attachment to one or more hash values stored in database 108. A match between at least one of the multiple hash values of the multiple versions of the attachment with at least one of the one or more hash values stored in database 108 may signal to comparison agent 124 that the file attachment is a sensitive file 115. Accordingly, comparison agent 124 may signal to attachment manager 111 to block the outgoing message that contains the file attachment corresponding to sensitive file 115.

In some embodiments, rather than converting sensitive files 115 of a database file type to an image for hashing, message management system 114 may store one or more sensitive files 115 of a database file type in database 130. As such, in some embodiments, when attachment manager 111 identifies a file attachment in an outgoing electronic message that is of a database file type, attachment manager 111 may pass control to database manager 125.

Database manager 125 may be configured to parse file attachments of a database file type to extract one or more sets of data contained therein. Database manager 125 may then generate a table using the one or more sets of data. If database manager 125 determines that the table is a subset of database 130, then database manager 125 may conclude that the file attachment is a sensitive file because all the information contained in the file attachment is indeed stored in database 130.

Figure 2A:
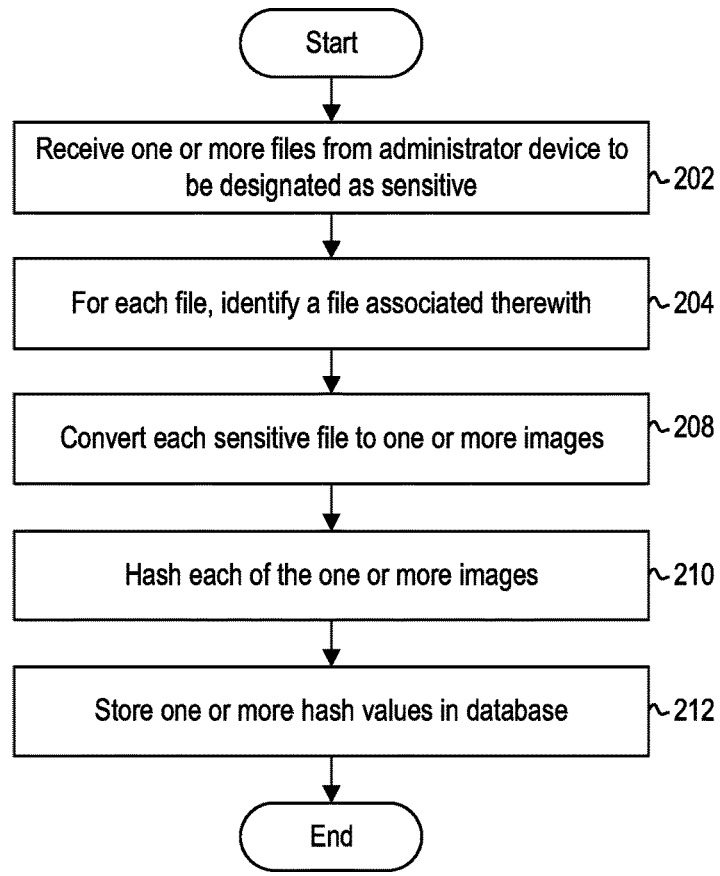
FIG. 2A is a flow diagram illustrating a method for marking one or more files as sensitive files, according to one exemplary embodiment.

FIG. 2A is a flow diagram illustrating a method 200 for marking one or more files (e.g., files 114) as sensitive files (e.g., sensitive files 115), according to one exemplary embodiment. At step 202, message management system 104 may receive one or more files 114 from administrator device 102 that are designated as sensitive files 115. For example, in some embodiments, administrator device 102 may upload one or more sensitive files 115 to message management system 104 via messaging application 116. In some embodiments, message management system 104 may receive direct access to file system 108, and actively scan one or more files 114 to identify one or more sensitive files 115. For example, message management system 104 may scan metadata associated with each file 114 to identify which of the one or more files 114 were marked as sensitive.

At step 204, for each sensitive file 115, message management system 104 may identify a file type associated therewith. For example, message management system 104 may identify that sensitive file 115 is of a database file type or a non-database file type. In some embodiments, message management system 104 may identify the file type on a more granular level. For example, message management system 104 may identify a particular database file type or a particular non-database file type of each sensitive file 115.

At step 206, message management system may convert each sensitive file 115 to one or more images. For example, document converter 120 may convert each sensitive file 115 from a first file type to one or more images in a second file type. Document converter 120 may create one or more images (e.g., .jpeg files) based on the sensitive file 115 (e.g., .doc file). The one or more images may include one or more portions of sensitive file 115, as well as the entirety of sensitive file 115.

At step 208, message management system 104 may hash each of the one or more images associated with a sensitive file 115. For example, hashing agent 122 may generate a hash value for each of the one or more images associated with a sensitive file 115 using a hashing function. Exemplary hashing functions may include, but are not limited to, SHA-512, CRC-64, MD6, and the like.

At step 210, message management system 104 may store each hash value in database 128. For example, hashing agent 122 may store each hash value in database 128. In some embodiments, hashing agent 122 may store each hash value in database 128 along with the sensitive file 115 to which one or more hash values correspond.

Figure 2B:
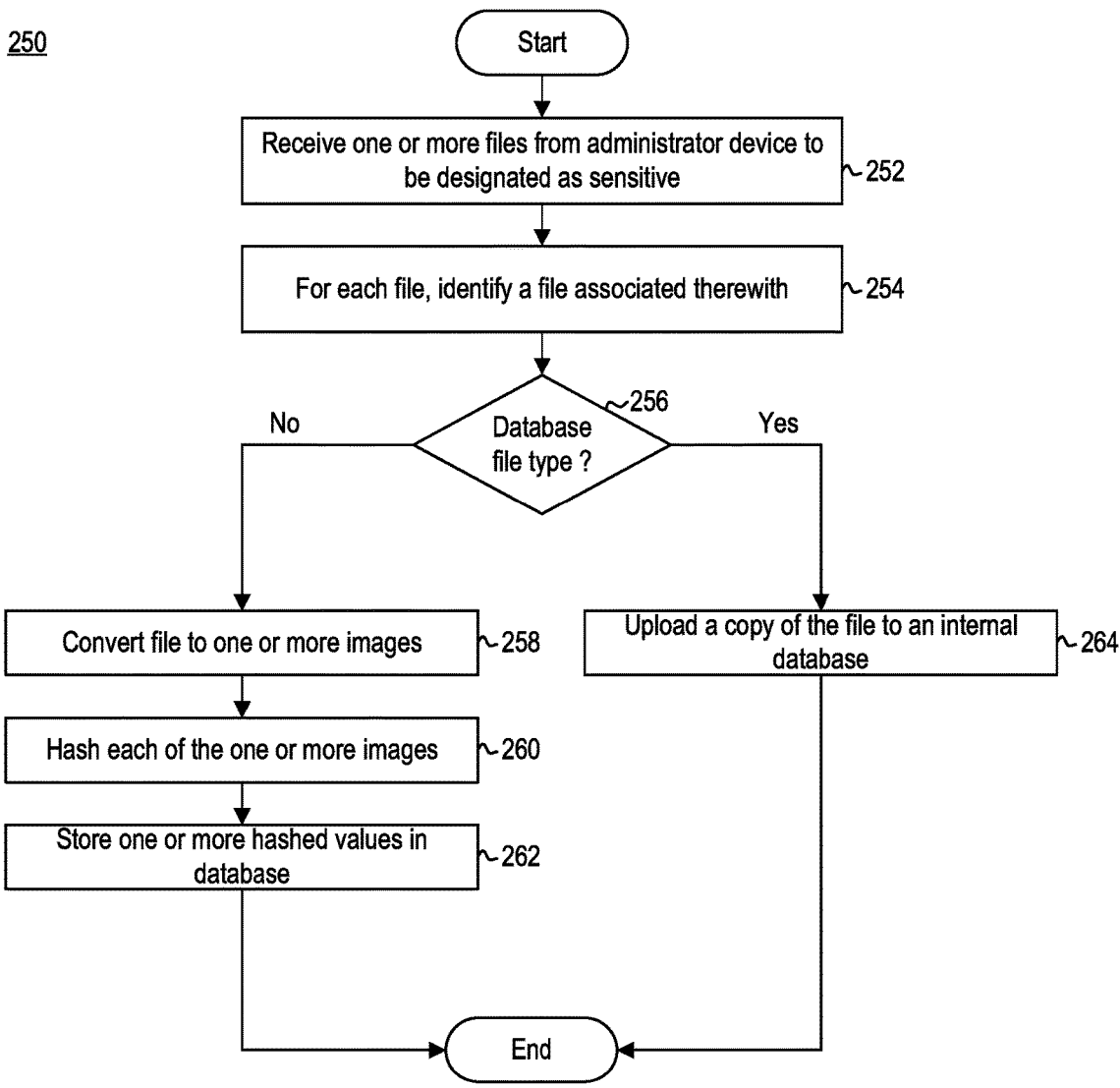
FIG. 2B is a flow diagram illustrating a method for marking one or more files as sensitive files, according to one exemplary embodiment.

FIG. 2B is a flow diagram illustrating a method 250 for marking one or more files (e.g., files 114) as sensitive (e.g., files 115), according to one exemplary embodiment. At step 252, message management system 104 may receive one or more files 114 from administrator device 102 that are designated as sensitive files 115. For example, in some embodiments, administrator device 102 may upload one or more sensitive files 115 to message management system 104 via messaging application 116. In some embodiments, message management system 104 may receive direct access to file system 108, and actively scan one or more files 114 to identify one or more sensitive files 115. For example, message management system 104 may scan metadata associated with each file 114 to identify which of the one or more files 114 were marked as sensitive.

At step 254, for each sensitive file 115, message management system 104 may identify a file type associated therewith. For example, message management system 104 may identify that sensitive file 115 is of a database file type or a non-database file type. In some embodiments, message management system 104 may identify the file type on a more granular level. For example, message management system 104 may identify a particular database file type or a particular non-database file type of each sensitive file 115.

At step 256, for each sensitive file 115, message management system 104 may determine if sensitive file 115 is of a database file type. If, at step 256, message management system 104 determines that sensitive file 115 is of a database file type, then method 250 proceeds to step 264.

At step 264, message management system 104 may upload a copy of sensitive file 115 to database 130. For example, database manager 125 may parse sensitive file 115, extract data therefrom, and upload a copy of the data to database 130.

If, however, at step 256, message management system 104 determines that sensitive file 115 is not of a database file type (i.e., non-database file type), then method 250 proceeds to step 258.

At step 258, message management system may convert each sensitive file 115 of a non-database file type to one or more images. For example, document converter 120 may convert each sensitive file 115 from a first file type (i.e., non-database file type) to one or more images in a second file type (raster graphic file type). Document converter 120 may create one or more images (e.g., .jpeg files) based on the sensitive file 115 (e.g., .doc file). The one or more images may include one or more portions of sensitive file 115, as well as the entirety of sensitive file 115.

At step 260, message management system 104 may hash each of the one or more images associated with a sensitive file 115. For example, hashing agent 122 may generate a hash value for each of the one or more images associated with a sensitive file 115 using a hashing function. Exemplary hashing functions may include, but are not limited to, SHA-512, CRC-64, MD6, and the like.

At step 262, message management system 104 may store each hash value in database 128. For example, hashing agent 122 may store each hash value in database 128. In some embodiments, hashing agent 122 may store each hash value in database 128 along with the sensitive file 115 to which one or more hash values correspond.

Figure 3:
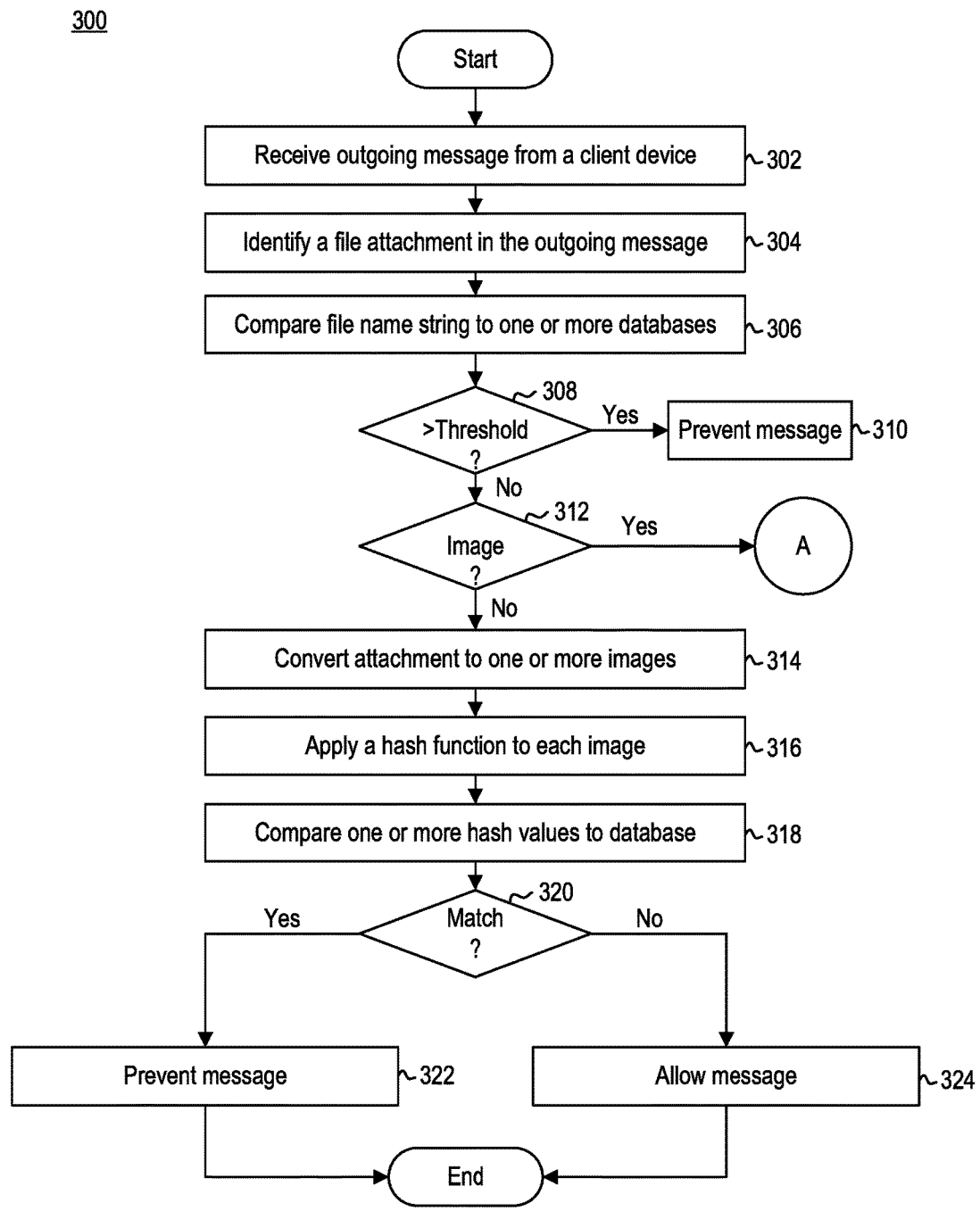
FIG. 3 is a flow diagram illustrating a method of preventing unauthorized access to an electronic mail attachment, according to one exemplary embodiment.

FIG. 3 is a flow diagram illustrating a method 300 of preventing unauthorized access to an electronic mail attachment, according to one exemplary embodiment. Method 300 may begin at step 302.

At step 302, message management system 104 may receive an outgoing message from client device 102. For example, message management system 104 may receive outgoing message from client device 102 via application 110 executing thereon. In some embodiments, attachment manager 111 may intercept outgoing message from proceeding to messaging service 116.

At step 304, message management system 104 may identify a file attachment in the outgoing message. For example, attachment manager 111 may determine that the outgoing message has a file attached thereto.

At step 306, message management system 104 may compare a file name string of the file attachment to database 128. For example, attachment manager 111 may compare the file name string of the file attachment to one or more file name strings of one or more sensitive files 115 in database 128.

At step 308, message management system 104 may determine whether the file name string of the file attachment exceeds a predetermined threshold. The predetermined threshold may be a determined similarity factor between characters in the file name string of the file attachment and characters in the file name string of a sensitive file 115. For example, attachment manager 111 may determine whether the file name of the file attachment is the same, or substantially the same as, a file name of a sensitive file 115.

If, at step 308, message management service 104 determines that the file name string of the file attachment exceeds the predetermined threshold, then at step 310, message management system 104 may prevent the outgoing message from proceeding to messaging service 106.

If, however, at step 308, message management service 104 determines that the file name string of the file attachment does not exceed the predetermined threshold, then method 300 proceeds to step 312. At step 312, message management system 104 may determine whether the file attachment is an image. For example, attachment manager 111 may identify a file type associated with the file attachment. In those examples in which the file type associated with the file attachment is a raster graphic file type, attachment manager 111 may conclude that the file type associated with the file attachment is an image.

If, at step 312, message management system 104 determines that the file attachment is an image, then method 300 proceeds to Operations A, which are discussed in conjunction with FIGS. 5 and 6 below.

If, however, at step 312, message management system 104 determines that the file attachment is not an image, then method 300 proceeds to step 314. At step 314, message management system 104 may convert the file attachment to one or more images. For example, document converter 120 may convert each file attachment from a first file type (i.e., non-database file type) to one or more images in a second file type (e.g., raster graphic file type). Document converter 120 may create one or more images (e.g., .jpeg files) based on the file attachment (e.g., .doc file). The one or more images may include one or more portions of the file attachment, as well as the entirety of the file attachment. Generally, document converter 120 may convert the file attachment similar to the operations used to convert each sensitive file 115 to one or more images, i.e., document converter 120 may convert file attachment to the same type of images as the one or more images of each sensitive file 115.

At step 316, message management system 104 may hash each of the one or more images associated with the file attachment. For example, hashing agent 122 may generate a hash value for each of the one or more images associated with the file attachment using a hashing function. Exemplary hashing functions may include, but are not limited to, SHA-512, CRC-64, MD6, and the like. Generally, hashing agent 122 may use the same hashing function that was used to generate hash values for each sensitive file 115.

At step 318, message management system 104 may compare the one or more hash values associated with the file attachment to one or more hash values stored in database 128. For example, comparison agent 124 may query database 128 with each of the one or more hash values to determine if at least one hash value associated with the file attachment matches at least one hash values stored in database 128.

At step 320, message management system 104 determine if there is a match between at least one of the one or more hash values associated with the file attachment and at least one of the one or more hash values stored in database 128.

If, at step 320, message management system 104 determines that there is a match (i.e., at least one hash value associated with the file attachment matches at least one hash value stored in database 128), then at step 322, message management system 104 prevents the message from proceeding to messaging service 106. In other words, message management system 104 has determined that the file attachment is a sensitive file 115.

If, however, at step 320, message management system 104 determines that there is not a match (i.e., none of the one or more hash values associated with the file attachment matches the one or more hash values stored in database 128), then at step 324, message management system 104 allows the message to proceed to messaging service 106. In other words, message management system 104 has determine that the file attachment is not a sensitive file 115.

Figure 4:
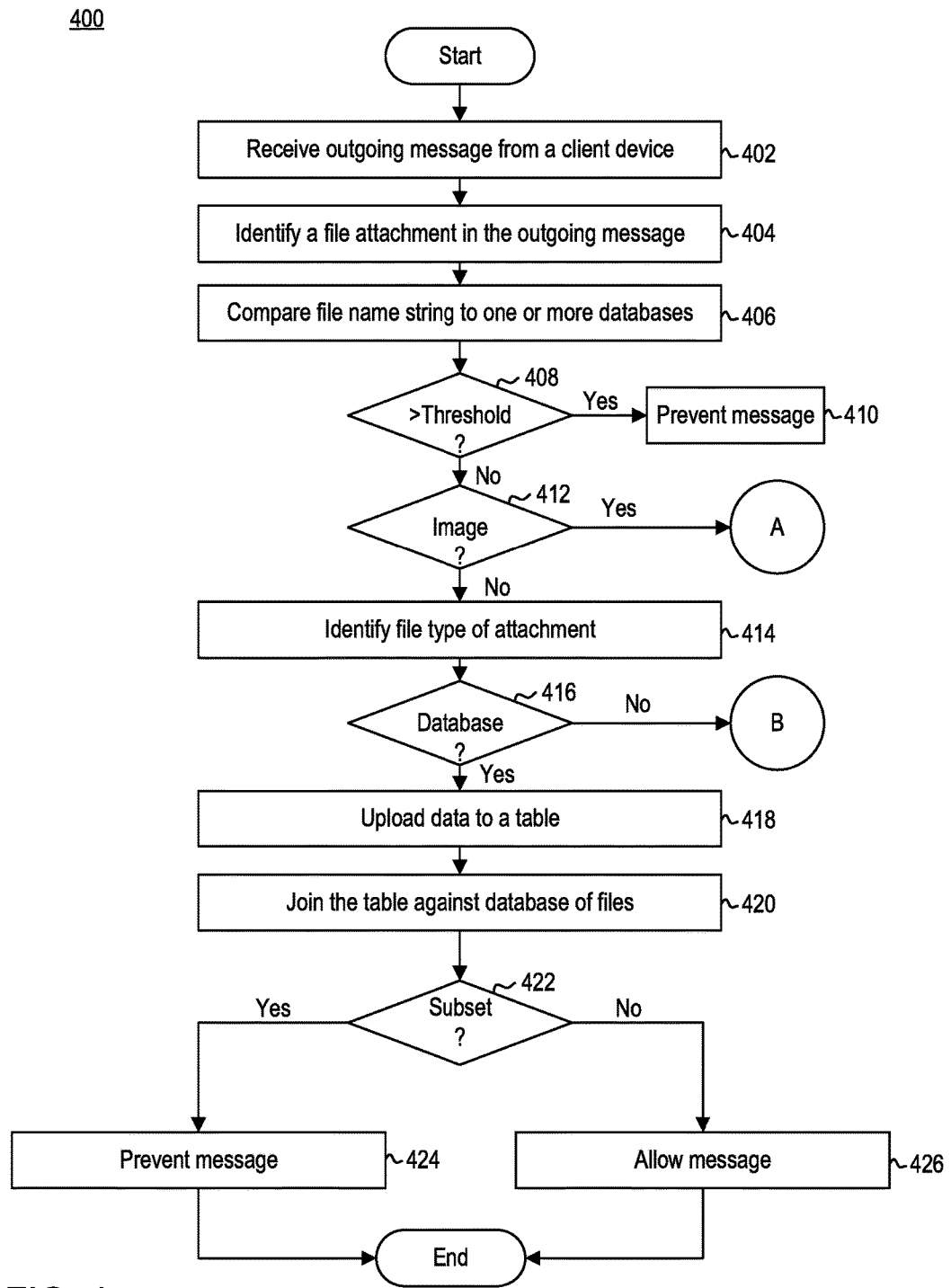
FIG. 4 is a flow diagram illustrating a method of preventing unauthorized access to an electronic mail attachment, according to one exemplary embodiment.

FIG. 4 is a flow diagram illustrating a method 400 of preventing unauthorized access to an electronic mail attachment, according to one exemplary embodiment. Method 400 may begin at step 402.

At step 402, message management system 104 may receive an outgoing message from client device 102. For example, message management system 104 may receive outgoing message from client device 102 via application 110 executing thereon. In some embodiments, attachment manager 111 may intercept outgoing message from proceeding to messaging service 116.

At step 404, message management system 104 may identify a file attachment in the outgoing message. For example, attachment manager 111 may determine that the outgoing message has a file attached thereto.

At step 406, message management system 104 may compare a file name string of the file attachment to database 128. For example, attachment manager 111 may compare the file name string of the file attachment to one or more file name strings of one or more sensitive files 115 in database 128.

At step 408, message management system 104 may determine whether the file name string of the file attachment exceeds a predetermined threshold. The predetermined threshold may be a determined similarity factor between characters in the file name string of the file attachment and characters in the file name string of a sensitive file 115. For example, attachment manager 111 may determine whether the file name of the file attachment is the same, or substantially the same as, a file name of a sensitive file 115.

If, at step 408, message management service 104 determines that the file name string of the file attachment exceeds the predetermined threshold, then at step 410, message management system 104 may prevent the outgoing message from proceeding to messaging service 106.

If, however, at step 408, message management service 104 determines that the file name string of the file attachment does not exceed the predetermined threshold, then method 300 proceeds to step 412. At step 412, message management system 104 may determine whether the file attachment is an image. For example, attachment manager 111 may identify a file type associated with the file attachment. In those examples in which the file type associated with the file attachment is a raster graphic file type, attachment manager 111 may conclude that the file type associated with the file attachment is an image.

If, at step 412, message management system 104 determines that the file attachment is an image, then method 400 proceeds to Operations A, which are discussed in conjunction with FIGS. 5 and 6 below.

If, however, at step 412, message management system 104 determines that the file attachment is not an image, then method 400 proceeds to step 414. At step 414, message management system 104 may identify a file type associated with the attachment. For example, attachment manager 111 may determine if the file type is a database file type or a non-database file type.

At step, 416, message management system 104 may determine if the file type is a database file type. If, at step 416, message management system 104 determines that the file attachment is of a file type that is a non-database file type, then method 400 proceeds to Operations B, which are discussed in conjunction with FIG. 7 below.

If, however, at step 416, message management system 104 determines that the file attachment is of a file type that is a database file type, then method 400 proceeds to step 418. At step 418, message management system 104 may upload data in the file attachment to a table. For example, database manager 125 may extract data from the file attachment and upload the data to the table.

At step 420, message management system 104 may join the table against database 130. For example, database manager 125 may invoke a JOIN structured query language (SQL) operation to combine data in the file attachment with the data in database 130.

At step 422, message management system 104 may determine if the table is a subset of database 130. If, at step 422, message management system determines that the table is a subset of database 130, then at step 424, message management system 104 prevents the message from proceeding to messaging service 106. In other words, message management system 104 has determined that the file attachment is a sensitive file 115.

If, however, at step 422, message management system 104 determines that the table is not a subset of database 130, then at step 426, message management system 104 allows the message to proceed to messaging service 106. In other words, message management system 104 has determine that the file attachment is not a sensitive file 115.

Figure 5:
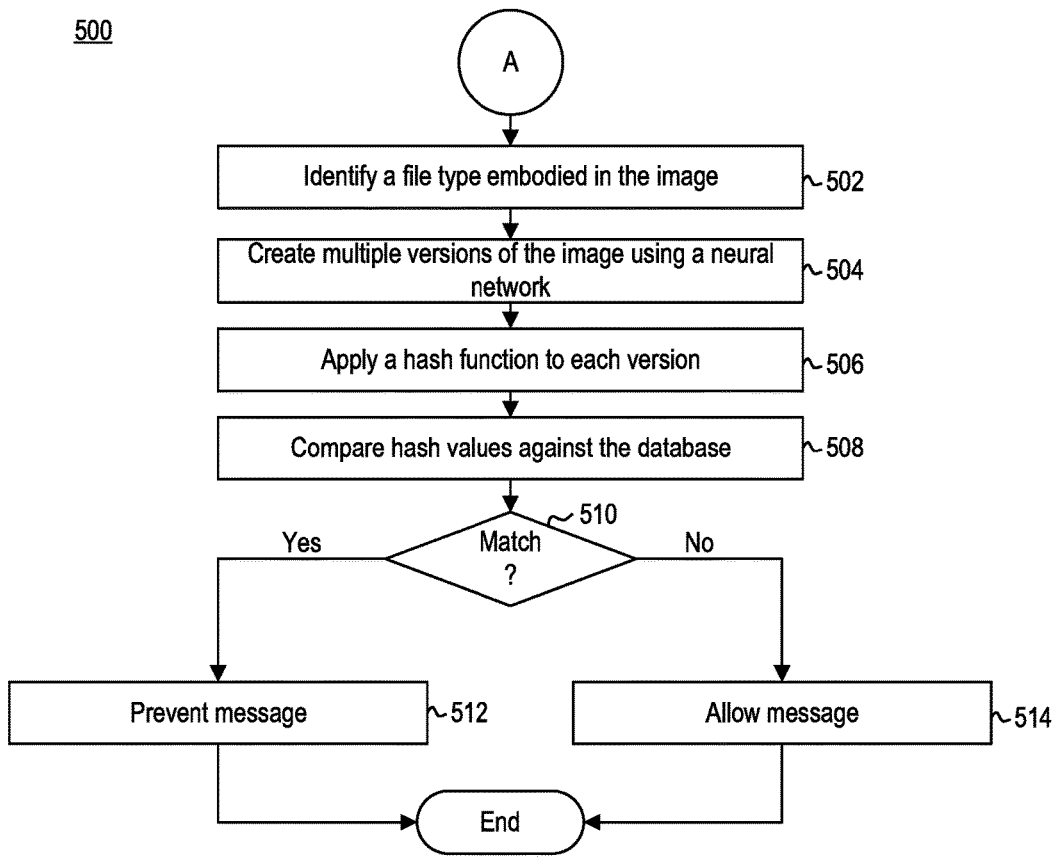
FIG. 5 is a flow diagram illustrating a method of preventing unauthorized access to an electronic mail attachment, according to one exemplary embodiment.

FIG. 5 is a flow diagram illustrating a method 500 of preventing unauthorized access to an electronic mail attachment, according to one exemplary embodiment. Method 500 may begin at step 502. Method 500 may correspond to Operations A in FIGS. 3 and 4 above.

At step 502, message management system 104 may generate multiple versions of the file attachment. For example, attachment manager 111 may instruct neural network module 121 to generate one or more versions of the image. Neural network module 121 may generate the one or more versions of the image. For example, neural network module 121 may generate one or more versions that include, but are not limited to, partial views of the image, greyscale version of the image, upscaled quality versions of the image, re-touched versions of the image, and the like.

At step 504, message management system 104 may hash each of the multiple versions of file attachment. For example, hashing agent 122 may generate a hash value for each of the multiple versions of the image using a hashing function. Exemplary hashing functions may include, but are not limited to, SHA-512, CRC-64, MD6, and the like. Generally, hashing agent 122 may use the same hashing function that was used to generate hash values for each sensitive file 115.

At step 506, message management system 104 may compare the multiple hash values associated with the file attachment to multiple hash values stored in database 128. For example, comparison agent 124 may query database 128 with each of the multiple version to determine if at least one hash value associated with the image matches at least one hash value stored in database 128.

At step 508, message management system 104 determine if there is a match between at least one of the one of the multiple versions of the file attachment and at least one of the one or more hash values stored in database 128.

If, at step 508, message management system 104 determines that there is a match (i.e., at least one hash value associated with the file attachment matches at least one hash value stored in database 128), then at step 510, message management system 104 prevents the message from proceeding to messaging service 106. In other words, message management system 104 has determined that the file attachment is a sensitive file 115.

If, however, at step 508, message management system 104 determines that there is not a match (i.e., none of the multiple hash values associated with the file attachment matches the one or more hash values stored in database 128), then at step 512, message management system 104 allows the message to proceed to messaging service 106. In other words, message management system 104 has determined that the file attachment is not a sensitive file 115.

Figure 6:
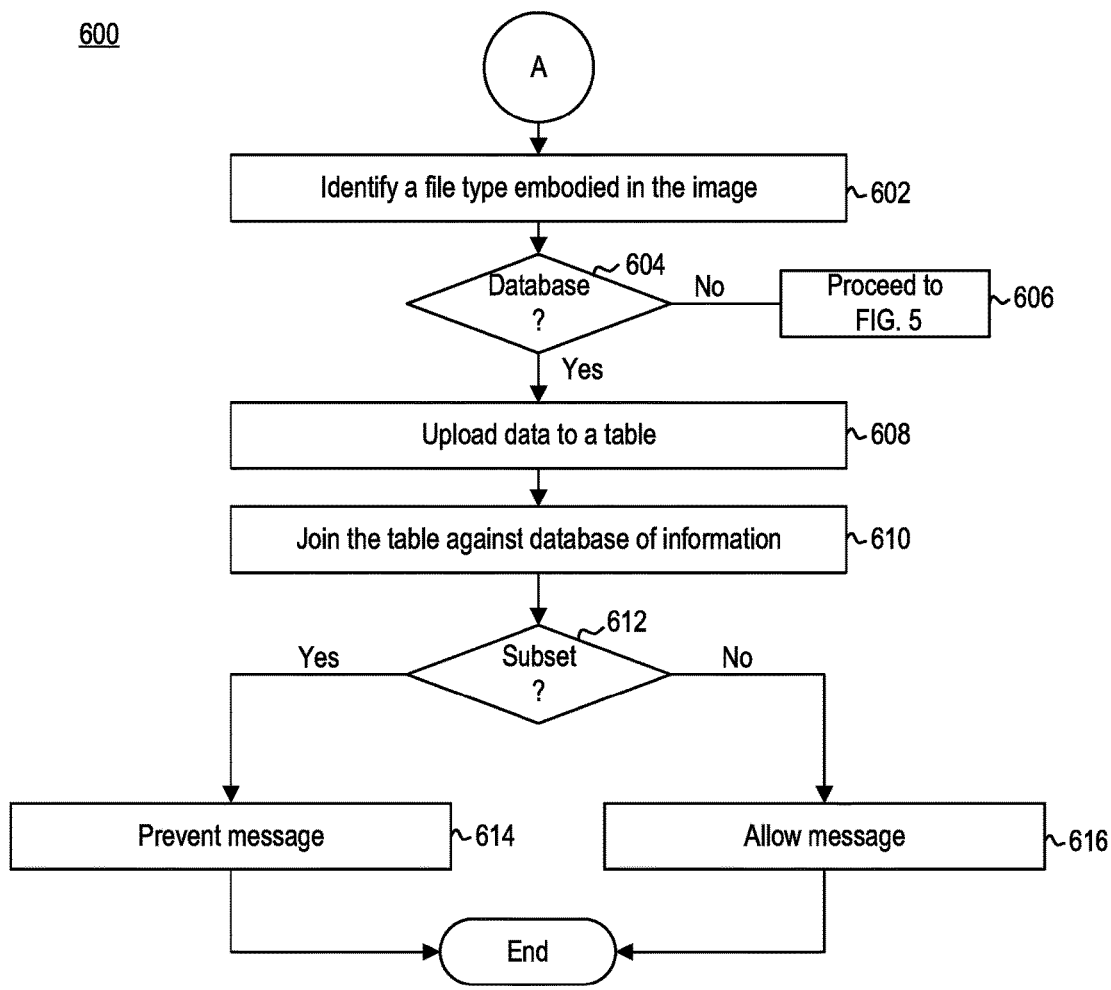
FIG. 6 is a flow diagram illustrating a method of preventing unauthorized access to an electronic mail attachment, according to one exemplary embodiment.

FIG. 6 is a flow diagram illustrating a method 600 of preventing unauthorized access to an electronic mail attachment, according to one exemplary embodiment. Method 600 may begin at step 602. Method 600 may correspond to Operations A in FIGS. 3 and 4 above.

At step 602, message management system 104 may identify a file type embodied in the file attachment. For example, attachment manager 111 may determine if the information captured by the image is a database file type or a non-database file type.

At step 604, message management system 104 may determine if the file type embodied in the file attachment is a database file type. If, at step 604, message management system 104 determines that the file type embodied in the file attachment is of a file type that is a non-database file type, then method 400 proceeds to step 606. At step 606, method 600 proceeds to the operations described above in conjunction with FIG. 5.

If, however, at step 604, message management system 104 determines that the file attachment is of a file type that is a database file type, then method 600 proceeds to step 608. At step 608, message management system 104 may upload data in the file attachment to a table. For example, database manager 125 may extract data from the image and upload the data to the table.

At step 610, message management system 104 may join the table against database 130. For example, database manager 125 may invoke a JOIN structured query language (SQL) operation to combine data in the file attachment with the data in database 130.

At step 612, message management system 104 may determine if the table is a subset of database 130. If, at step 612, message management system determines that the table is a subset of database 130, then at step 614, message management system 104 prevents the message from proceeding to messaging service 106. In other words, message management system 104 has determined that the file attachment is a sensitive file 115.

If, however, at step 612, message management system 104 determines that the table is not a subset of database 130, then at step 616, message management system 104 allows the message to proceed to messaging service 106. In other words, message management system 104 has determine that the file attachment is not a sensitive file 115.

Figure 7:
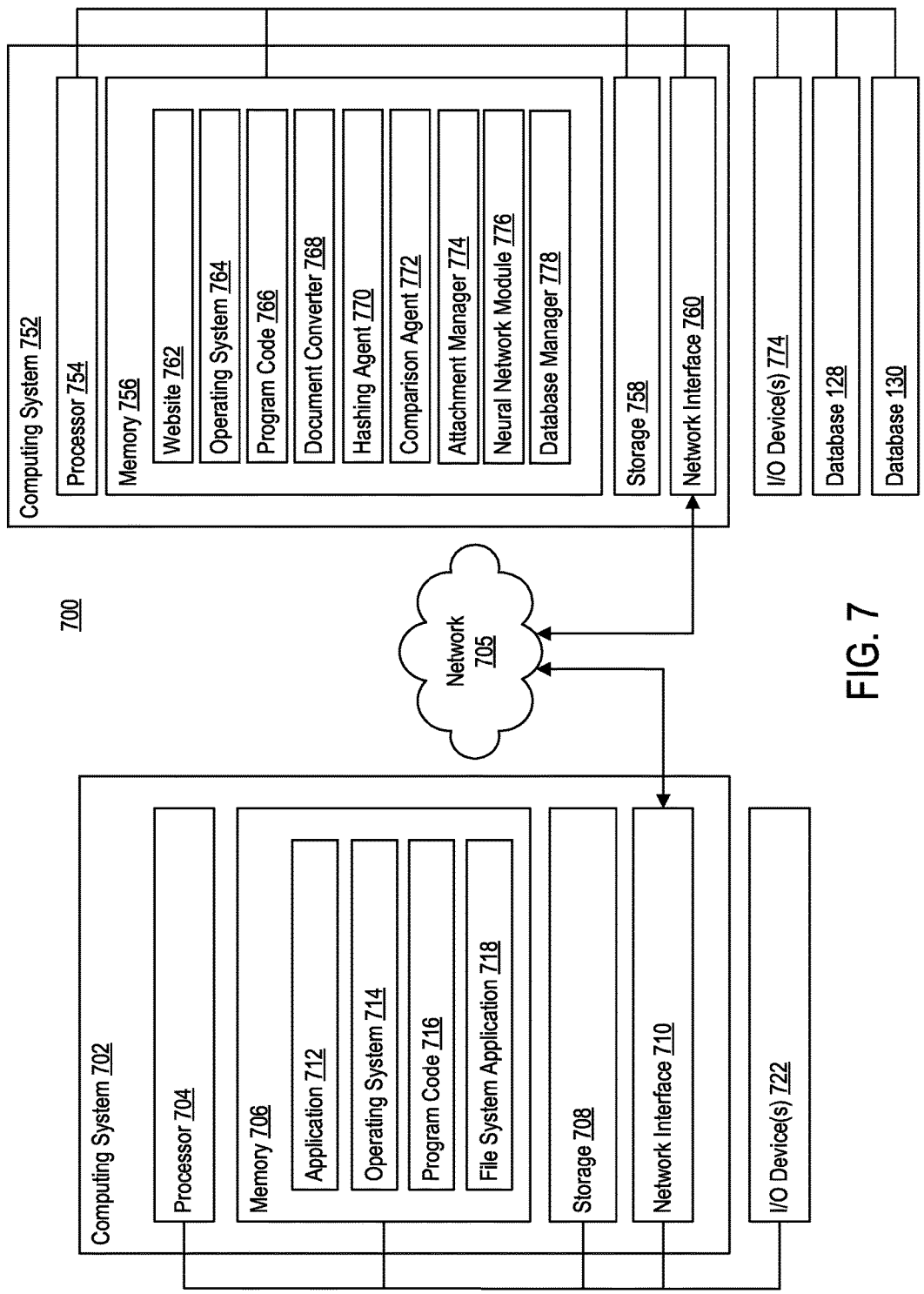
FIG. 7 is a block diagram illustrating a computing environment, according to one embodiment.

FIG. 7 is a block diagram illustrating an exemplary computing environment 700, according to some embodiments. Computing environment 700 includes computing system 702 and computing system 752. Computing system 702 may be representative of client device 101. In some embodiments, computing system 702 may further be representative of administrator device 102. Computing system 752 may be representative of message management system 104.

Computing system 702 may include a processor 704, a memory 706, a storage 708, and a network interface 710. In some embodiments, computing system 702 may be coupled to one or more I/O device(s) 722 (e.g., keyboard, mouse, etc.).

Processor 704 may retrieve and execute program code 716 (i.e., programming instructions) stored in memory 706, as well as stores and retrieves application data. Processor 704 may be included to be representative of a single processor, multiple processors, a single processor having multiple processing cores, and the like. Network interface 710 may be any type of network communications allowing computing system 702 to communicate externally via computing network 705. For example, network interface 710 is configured to enable external communication with computing system 752.

Storage 708 may be, for example, a disk storage device. Although shown as a single unit, storage 708 may be a combination of fixed and/or removable storage devices, such as fixed disk drives, removable memory cards, optical storage, network attached storage (NAS), storage area network (SAN), and the like.

Memory 706 may include messaging application 712, operating system 714, program code 718, and file system application 718. Program code 718 may be accessed by processor 704 for processing (i.e., executing program instructions). Program code 718 may include, for example, executable instructions for communicating with computing system 752 to display one or more pages of website 762.

Processor 704 may access messaging application 712 to access functionality of computing system 752. For example, processor 704 may be configured to execute messaging application 712 to manage an electronic message account managed by computing system 752. The content that is displayed to computing system 702 may be transmitted to computing system 702 via messaging application 712, and subsequently processed by messaging application 712 for display through a graphical user interface (GUI) of computing system 702.

Processor 704 may access file system application 718 to access functionality of a file system of an organization. Processor 704 may communicate over a network, via file system application 718, to request one or more files from file system 108. For example, processor 704 may be configured to execute file system application 718 to retrieve one or more files from a file system, edit one or more files stored on a file system, add one or more files to a file system, and/or manage one or more files on a file system. The content that is displayed to computing system 702 may be transmitted to computing system 702, and subsequently processed by file system application 718 for display through a GUI of computing system 702.

Computing system 752 may include a processor 754, a memory 756, a storage 758, and a network interface 760. In some embodiments, computing system 752 may be coupled to one or more I/O device(s) 774. In some embodiments, computing system 752 may be in communication with database 128 and database 130.

Processor 754 may retrieve and execute program code 766 (i.e., programming instructions) stored in memory 756, as well as stores and retrieves application data. Processor 754 is included to be representative of a single processor, multiple processors, a single processor having multiple processing cores, and the like. Network interface 760 may be any type of network communications enabling computing system 752 to communicate externally via computing network 705. For example, network interface 760 allows computing system 752 to communicate with computing system 702.

Storage 758 may be, for example, a disk storage device. Although shown as a single unit, storage 758 may be a combination of fixed and/or removable storage devices, such as fixed disk drives, removable memory cards, optical storage, network attached storage (NAS), storage area network (SAN), and the like.

Memory 756 may include website 762, operating system 764, program code 766, document converter 768, hashing agent 770, comparison agent 772, attachment manager 774, neural network module 776, and database manager 778. Program code 766 may be accessed by processor 454 for processing (i.e., executing program instructions). Program code 766 may include, for example, executable instructions configured to perform steps discussed above in conjunction with FIGS. 2A-7. As an example, processor 754 may access program code 766 to hashing sensitive files and identifying one or more file attachments as sensitive. Website 762 may be accessed by computing system 702. For example, website 762 may include content accessed by computing system 702 via a web browser or application.

Document converter 768 may be configured to convert one or more sensitive files from a first file type to a second file type. In operation, document converter 768 may be configured to identify a first file type associated with a particular sensitive file. For example, document converter 768 may identify that the first file type of a particular sensitive file is a non-database file type.

Hashing agent 770 may be configured to generate a hash value for each sensitive file converted to the second file type using a hash function. For example, as recited above, document converter 768 may convert a sensitive file having a first file type (e.g., .doc, .ppt, .pdf, .xls, etc.) to one or more files in a second file type (e.g., .jpeg, .png, etc.). Each of the one or more files in the second file type may be hashed by hashing agent 770 using a hashing function, such that a hash value is generated for each of the one or more files.

Comparison agent 772 may be configured to compare one or more hash values of the one or more converted file attachments to one or more hash values stored in database 128. A match between at least one of the one or more hash values of the one or more converted file attachments with at least one of the one or more hash values stored in database 128 may signal to comparison agent 772 that the file attachment is a sensitive file.

Attachment manager 774 may be configured to intercept one or more outgoing electronic messages from computing system 702. Upon receiving an outgoing electronic message from computing system 702, attachment manager 774 may determine whether the outgoing electronic message includes a file attachment thereto. Attachment manager 774 may parse the file attachment to determine a file type of the file attachment.

Document converter 768 may be configured to convert file attachments in outgoing electronic messages from a first file type to a second file type to determine whether a file attachment to an outgoing electronic message is a sensitive file. Hashing agent 770 may be configured to generate a hash value for each file attachment converted to the second file type using a hash function.

Neural network module 776 may be configured to create multiple versions of the file attachment. Neural network module 776 may generate the multiple versions of the file attachment using a neural network model. The multiple versions of the file attachment may include a gray-scaled version of the file attachment, one or more partial versions of the file attachment, an up-scaled version of the file attachment, and the like.

Database manager 778 may be configured to parse file attachments of a database file type to extract one or more sets of data contained therein. Database manager 778 may then generate a table using the one or more sets of data. If database manager 778 determines that the table is a subset of database 130, then database manager 778 may conclude that the file attachment is a sensitive file because all the information contained in the file attachment is indeed stored in database 130.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of preventing unauthorized access to electronic mail attachment, comprising:
   receiving, from an administrator computing device at a message management system, one or more files designated as sensitive files;
   for each file of the one or more files, converting, by the message management system, the file to one or more images;
   generating, by the message management system, one or more hash values by applying a hash function to each of the one or more images corresponding to the file;
   storing, by the message management system, the one or more hash values in a database;
   receiving, from a client device at the message management system, an outgoing electronic message comprising an attached file;
   generating, by the message management system, one or more attachment hash values for the attached file by applying the hash function to the attached file by:
      converting the attached file to one or more attachment images; and
      applying the hash function to the one or more attachment images;
   comparing, by the message management system, the one or more attachment hash values to the database storing the one or more hash values associated with the one or more files designated as sensitive files;
   determining, by the message management system, that at least one attachment hash value of the one or more attachment hash values matches at least one hash value of the one or more hash values stored in the database; and
   blocking, by the message management system, the outgoing electronic message.

2. The method of claim 1, wherein a file type of the one or more images and an attachment file type of the one or more attachment images are the same.

3. The method of claim 1, wherein generating, by the message management system, the one or more attachment hash values for the attached file by applying the hash function to the attached file, comprises:
   determining that the attached file is an attachment image;
   generating multiple versions of the attachment image using a neural network model; and
   applying the hash function to each version of the multiple versions of the attachment image.

4. The method of claim 1, further comprising:
   receiving, from a second client device at the message management system, a second outgoing electronic message comprising a second attached file;
   generating, by the message management system, one or more second attachment hash values for the second attached file by applying the hash function to the second attached file;
   comparing, by the message management system, the one or more second attachment hash values to the database storing the one or more hash values associated with the one or more files designated as sensitive files;

determining, by the message management system, that none of the second attachment hash values matches at least one hash value of the one or more hash values stored in the database; and permitting, by the message management system, the second outgoing electronic message.

5. The method of claim 4, wherein permitting, by the message management system, the second outgoing electronic message, comprises:

forwarding the second outgoing electronic message to a remote messaging service.

6. The method of claim 1, further comprising:

receiving, from a second client device at the message management system, a second outgoing electronic message comprising a second attached file;

comparing, by the message management system, a second file name string associated with the second attached file to one or more file name strings stored in the database;

determining, by the message management system, that the second file name string is within a threshold amount of characters as at least one file name string stored in the database; and blocking, by the message management system, the second outgoing electronic message.

7. A method of preventing unauthorized access to electronic mail attachment, comprising:

receiving, from an administrator computing device at a message management system, one or more files designated as sensitive files;

for each file of the one or more files, converting, by the message management system, the file to one or more images;

generating, by the message management system, one or more hash values by applying a hash function to each of the one or more images corresponding to the file;

storing, by the message management system, the one or more hash values in a database;

receiving, from a client device at the message management system, an outgoing electronic message comprising an attached file;

generating, by the message management system, one or more attachment hash values for the attached file by applying the hash function to the attached file by:

converting the attached file to one or more attachment images; and applying the hash function to the one or more attachment images;

comparing, by the message management system, the one or more attachment hash values to a database storing one or more hash values associated with one or more files pre-designated as sensitive files;

determining, by the message management system, that at least one attachment hash value of the one or more attachment hash values matches at least one hash value of the one or more hash values stored in the database; and blocking, by the message management system, the outgoing electronic message.

8. The method of claim 7, wherein a file type of the one or more images and an attachment file type of the one or more attachment images are the same.

9. The method of claim 7, wherein generating, by the message management system, the one or more attachment hash values for the attached file by applying the hash function to the attached file, comprises:

determining that the attached file is an attachment image;

generating multiple versions of the attachment image using a neural network model; and applying the hash function to each version of the multiple versions of the attachment image.

10. The method of claim 7, further comprising:

receiving, from the client device at the message management system, a second outgoing electronic message comprising a second attached file;

determining, by the message management system, that the second attached file is of a database file type;

uploading, by the message management system, data in the second attached file to a database table;

joining, by the message management system, the database table to a second database storing a set of database files pre-designated as sensitive files;

determining, by the message management system, that the database table is a subset of the second database; and blocking, by the message management system, the second outgoing electronic message.

11. A system, comprising:

a processor; and a memory having programming instructions stored thereon, which, when executed by the processor, performs operations of preventing unauthorized access to electronic mail attachment, the operations comprising:

receiving, from an administrator computing device, one or more files designated as sensitive files;

for each file of the one or more files, converting the file to one or more images;

generating one or more hash values by applying a hash function to each of the one or more images corresponding to the file;

storing the one or more hash values in a database;

receiving, from a client device, an outgoing electronic message comprising an attached file;

generating one or more attachment hash values for the attached file by applying the hash function to the attached file by:

converting the attached file to one or more attachment images; and applying the hash function to the one or more attachment images;

comparing the one or more attachment hash values to the database storing the one or more hash values associated with the one or more files designated as sensitive files;

determining that at least one attachment hash value of the one or more attachment hash values matches at least one hash value of the one or more hash values stored in the database; and blocking the outgoing electronic message.

12. The system of claim 11, wherein a file type of the one or more images and an attachment file type of the one or more attachment images are the same.

13. The system of claim 11, wherein generating the one or more attachment hash values for the attached file by applying the hash function to the attached file, comprises:

determining that the attached file is an attachment image;

generating multiple versions of the attachment image using a neural network model; and applying the hash function to each version of the multiple versions of the attachment image.

14. The system of claim 11, wherein the operations further comprise:

receiving, from a second client device, a second outgoing electronic message comprising a second attached file;

generating one or more second attachment hash values for the second attached file by applying the hash function to the second attached file;

comparing the one or more second attachment hash values to the database storing the one or more hash values associated with the one or more files designated as sensitive files;

determining that none of the second attachment hash values matches at least one hash value of the one or more hash values stored in the database; and permitting the second outgoing electronic message.

15. The system of claim 14, wherein permitting the second outgoing electronic message, comprises:

forwarding the second outgoing electronic message to a remote messaging service.

16. The system of claim 11, wherein the operations further comprise:

receiving, from a second client device, a second outgoing electronic message comprising a second attached file;

comparing a second file name string associated with the second attached file to one or more file name strings stored in the database;

determining that the second file name string is within a threshold amount of characters as at least one file name string stored in the database; and blocking the second outgoing electronic message.

17. The system of claim 11, wherein receiving, from a client device, an outgoing electronic message comprising an attached file comprises:

intercepting the outgoing electronic message sent from the client device to a recipient client device.

* * * * *